Sept. 3, 1968     R. S. EVANS     3,399,472
SPREADING APPARATUS FOR FLAT WORK IRONERS
Filed April 24, 1967     3 Sheets-Sheet 1

INVENTOR
RALPH S. EVANS
BY

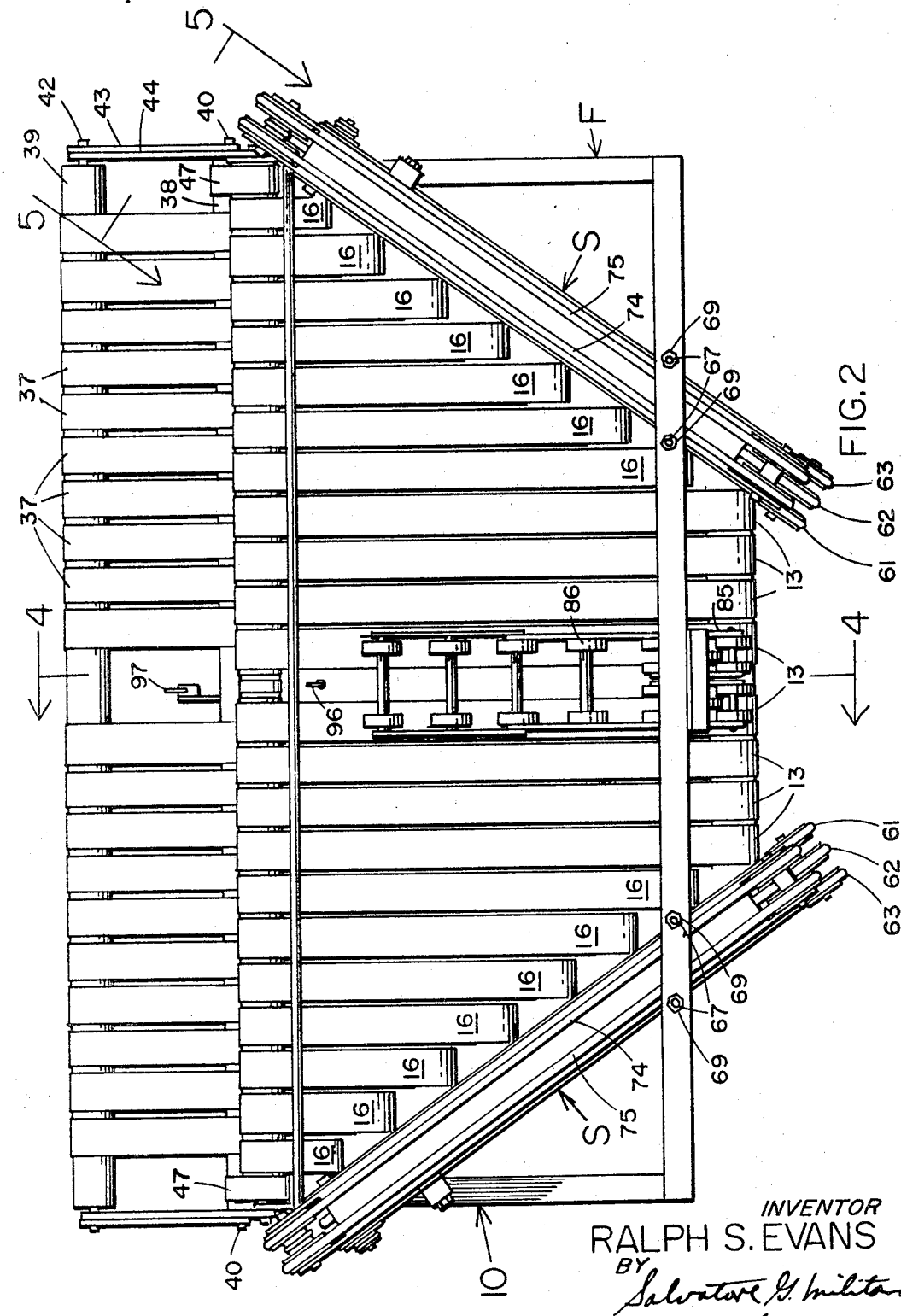

Sept. 3, 1968         R. S. EVANS         3,399,472
SPREADING APPARATUS FOR FLAT WORK IRONERS
Filed April 24, 1967                3 Sheets-Sheet 3

INVENTOR
RALPH S. EVANS
BY
Salvatore G. Militana,
attorney

United States Patent Office 3,399,472
Patented Sept. 3, 1968

3,399,472
SPREADING APPARATUS FOR FLAT
WORK IRONERS
Ralph S. Evans, 4711 NW. 170th St.,
Miami, Fla. 33169
Filed Apr. 24, 1967, Ser. No. 633,264
6 Claims. (Cl. 38—143)

ABSTRACT OF THE DISCLOSURE

A spreading apparatus for spreading flat work for conventional flat work ironers having a plurality of horizontally disposed conveyor belts formed in a trapezoidal shape, a system of pulleys and endless belts mounted on each side of the conveyor belts with the rear portions extending in a direction away from each other, each system consisting of two groups of endless belts with pulleys engaging same at each end, one group mounted above the other with portions of the endless belts overlapping each other whereby flat work conveyed rearwardly by the conveyor belts will be engaged by and between the overlapping portions of the endless belts and be conveyed rearwardly and outwardly to remove the wrinkles from the flat work and weighted idler rollers mounted above the conveyor belts to prevent sidewise movement of the flat work.

---

This invention relates to commercial ironing machines and is more particularly directed to a flat work spreading apparatus for flat work ironers.

A principal object of the present invention is to provide a spreading apparatus that is used in conjunction with any of the conventional commercial flat work ironers for spreading all flat work automatically and effectively prior to the flat work being deposited on the conventional flat work ironer which in turn then irons the flat work without any wrinkles thereon.

Another object of the present invention is to provide a spreading apparatus for flat work which reduces to a minimum of one person to feed flat work thereon whereby the flat work is spread and deposited on a conventional flat work ironer that now requires as many as six persons for feeding flat work directly thereon.

A further object of the present invention is to provide a flat work spreading apparatus that increases the quality of ironing done by the conventional flat work ironer to a high degree as well as increases the efficiency of the latter.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

FIGURE 2 is a top plan view.

Figure 1:
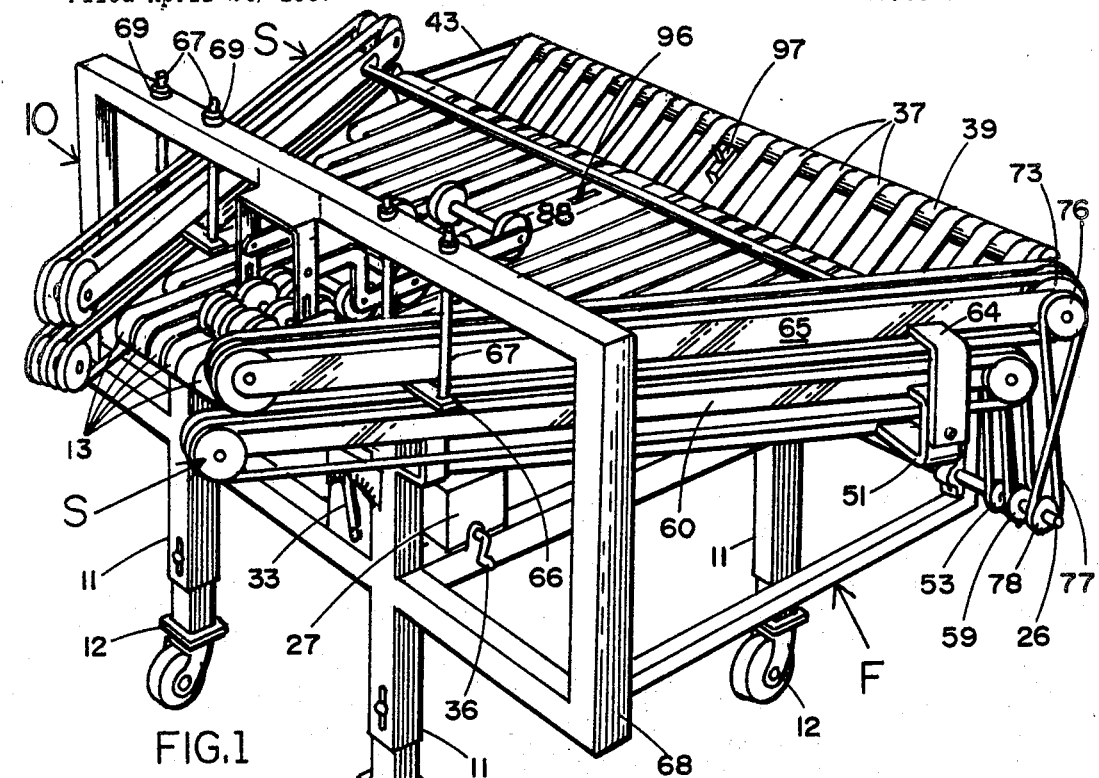
FIGURE 1 is a perspective view of my flat work spreading apparatus for conventional flat work ironers.

Referring to the drawings wherein like numerals are used to designate similar parts throughout the several views, the numeral 10 refers to a flat work spreading apparatus for flat work ironers constructed in accordance with my invention consisting of a box-like framework F made of angle iron and supported on legs 11. Adjustably secured to the legs 11 are caster assemblies 12 which permit one to roll my flat work spreader 10 into a proper position in front of a conventional flat work ironer (not shown) whereby the flat work spread by my apparatus 10 will be discharged from the apparatus 10 onto the first of the conveyor belts of the conventional flat work ironer in a properly spread and wrinkle-free condition as explained in detail hereinafter.

Approximately chest high is a plurality of horizontally disposed endless conveyor belts 13 which extend over rollers 14 and 15 that are rotatably mounted at the front and rear portions respectively of the framework F. The front roller 14 is set forwardly of the frame F to permit an operator of my apparatus to stand in front of the apparatus 10 in close proximity to the front roller 14 wiht a basket of flat work between himself and the legs 11 of the apparatus 10. The front roller 14 is shorter in length than the rear roller 15 and has only eight conveyor belts 13 engaged thereon while the rear roller 15 is engaged by an additional seven conveyor belts 16 on each side of the conveyor belts 13. The front ends of the conveyor belts 16 are wound about rollers 17–23 inclusive, mounted in a plane extending between the ends of the rollers 14 and 15 to form a somewhat trapezoidal shaped bed of conveyor belts 13, 16. The conveyor belts 13, 16 are activated by the roller 15 on which is mounted pulleys 34 connected by endless belts 24 that extend downwardly to pulleys 25. The pulleys 25 are mounted on a shaft 26 that is journalled to the frame F and extends the full width of the apparatus 10 at the back portion thereof. The shaft 26 is powered by a motor 27 mounted at the front end of the device 10 and connected by gearing 28 to a reduction gear box 29 whose shaft 30 is provided with a pulley 31. An endless belt 32 that extends between the pulley 31 and a pulley 45 rotates the shaft 26. The motor 27 has mounted on its front portion a dial 33 for indicating the speed of rotation of the conventional variable speed motor 27 and a crank 36 which adjusts the speed of the motor to achieve the desired speed of the conveyor belts 13, 16.

Figure 5:
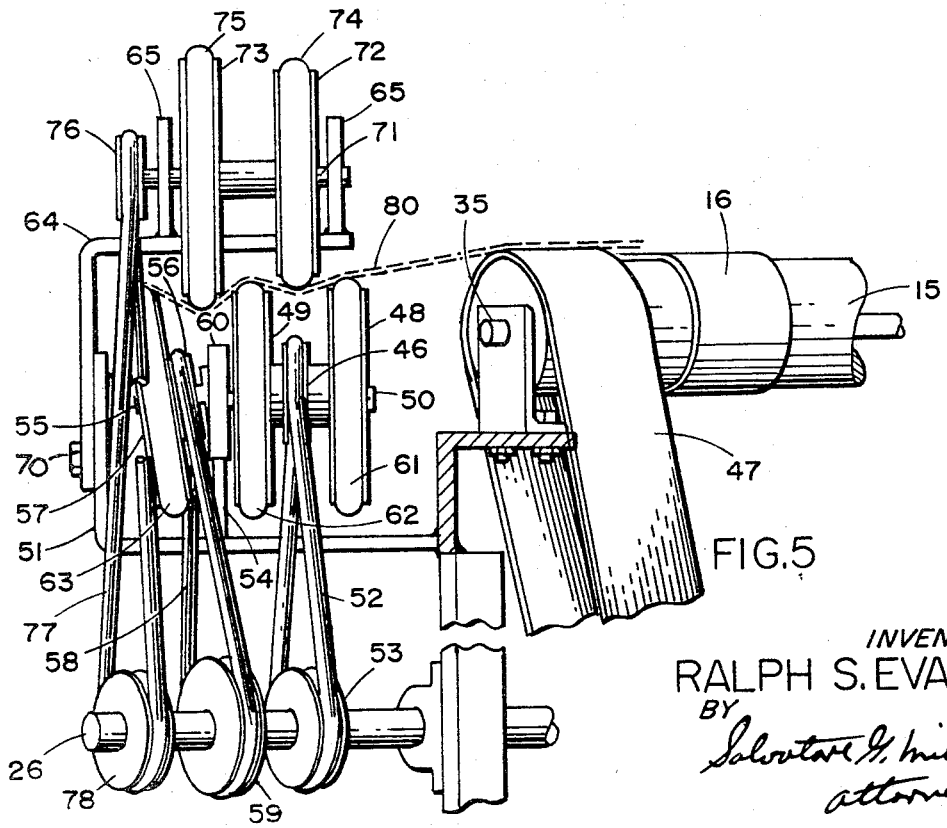
FIGURE 5 is a fragmentary cross sectional view taken along the line 5—5 of FIGURE 2.

To the rear of the conveyor belts 13, 16 is a second conveyor system consisting of a plurality of inclined conveyor belts 37 set in an inclined position and engaging rollers 38 and 39. Roller 38 which is below the roller 15 is provided with a shaft 40 whose ends are rotatably mounted on one end of plate 41, whose other end is secured to the frame F. Roller 39 is provided with a shaft 42 mounted on one end of plates 43 and 44 whose other ends are supported on the shaft 40 and the shaft 35 on which the roller 15 is mounted. It is to be noted that the portion of roller 15 engaged by the conveyor belts 13, 16 is of constant diameter and the end portions engaged by power transmission belts 47 are slightly larger in diameter, see FIGURE 5. The endless belts 47 engage the rollers 15 and 38 to transmit a slightly faster rotating power to the conveyor belts 37, so that flat work discharged at the rear by the conveyor belts 13, 16 will drop onto the conveyor belts 37 and be discharged at the position of the rearmost roller 39 onto the conventional flat work ironer (not shown).

At each of the obliquely disposed sides of my spreader apparatus 10 is a spreader belt mechanism S which functions to spread out a piece of flat work such as sheets, bed spreads, tablecloths, etc, that are placed on the conveyor belts 13 as the flat work is carried by the conveyor belts 13, 16 toward the conveyor belts 37.

The spreader mechanisms S which are mounted on each side of the apparatus 10 consists of an elongated bar 60 having a shaft 50 rotatably mounted at each end thereof. A pair of pulleys 48 and 49 are secured to each of the shafts 50 with endless belts 61 and 62 engaging the pulleys 48 and 49 respectively. A support plate 54 supports the rear portion of the bar 60 on a bracket 51 which is welded or otherwise secured to the frame F. To the other end of the bracket 51 is secured a second bracket 64. Power is transmitted to the pulleys 48, 49 by an endless belt 52 which engages a pulley 46 mounted on the rear shaft 50 and a pulley 53 mounted on the power shaft 26. At the position of each of the shafts 50 is a shaft 55 which is supported on the bar 60 and are tilted slightly downwardly out of axial alignment with the shafts 50. At the rear portion of each of the spreader assemblies S there is a further pulley 56 mounted on the shaft 55. The pulley 56 is engaged by an endless belt 58 which extends about a pulley 59 mounted on the power shaft 26. The pulleys 48 at each end of the frame F are interconnected by an endless spreader belt or spring 61 while the pulleys 49 and 57 at each end of the frame F are interconnected by similar spreader belts 62 and 63 respectively.

Figure 3:
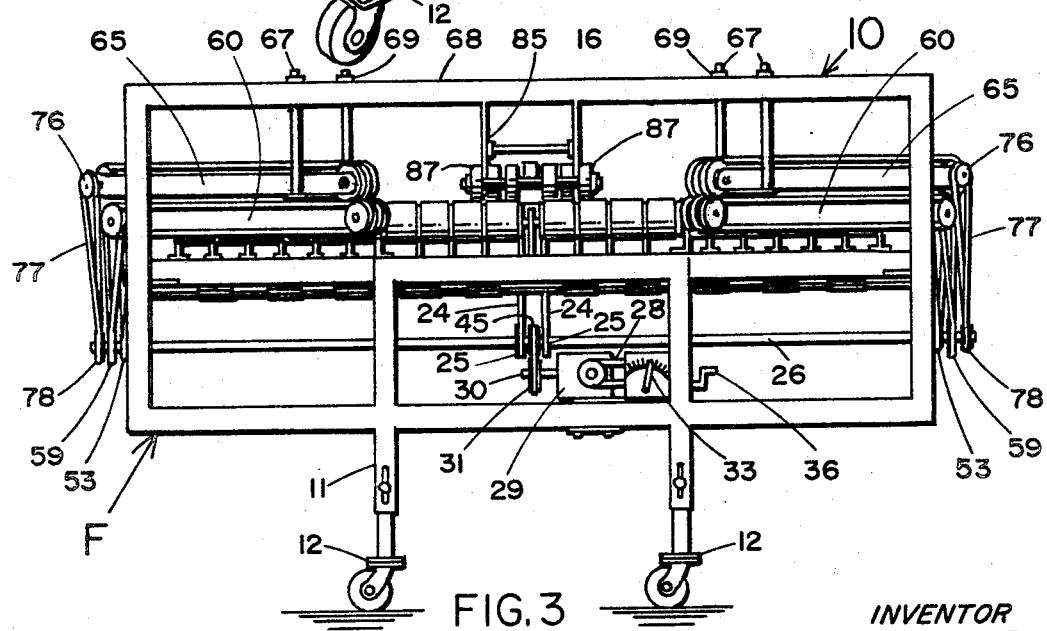
FIGURE 3 is a front elevational view.
Figure 4:
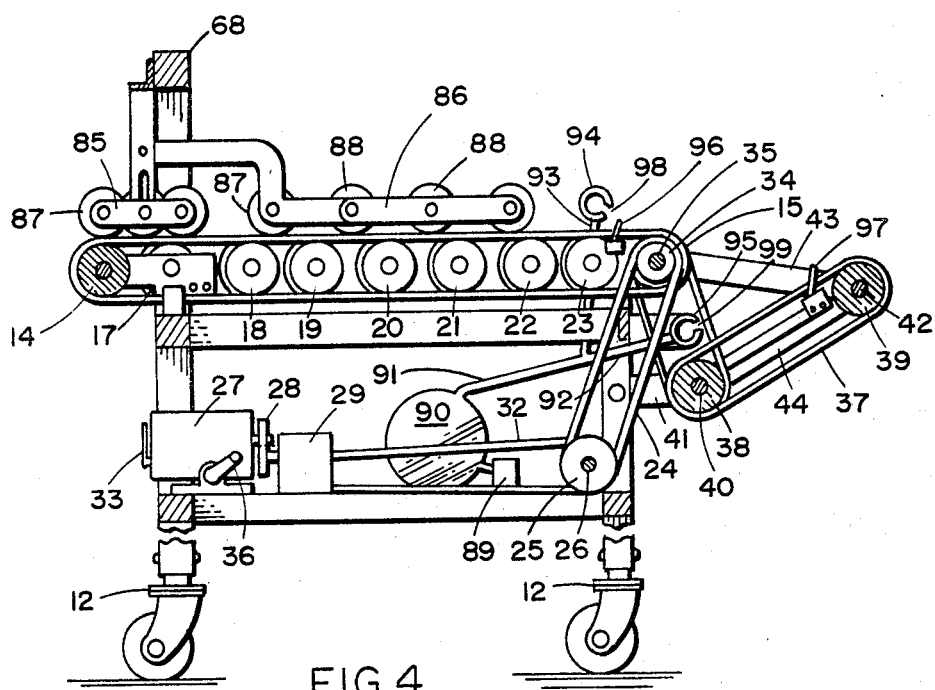
FIGURE 4 is a cross sectional view taken along the line 4—4 of FIGURE 2.

Pivotally secured to the rear brackets 51 by a pivot bolt 70 is an L-shaped bracket arm 64 on which is secured one end of a pair of elongated support bars 65 that extend the full length of the frame F above the support bar 60. The front end of the support bars 65 rest on a strap 66 whose ends are provided with bores for receiving bolts 67. See FIGURES 1 and 3. The upper ends of the bolts 67 extend through bores in a horizontal frame member 68 and secured thereon by nuts 69. By virtue of the pivot bolt 70, the bracket 64 permits the front end of the support bar 65 along with the upper portion of the spreader mechanism S to swing upwardly to prevent injury to an operator in the event he should get his fingers or hand caught therebetween. Rotatably mounted at the ends of the bars 65 is a shaft 71 with a pair of pulleys 72 and 73 secured thereon, see FIGURE 5. The pulleys 72 are interconnected by an endless spreader belt or spring 74 while the pulleys 73 are interconnected by a similar spreader belt 75. Note that the pulleys 73 are slightly larger than the pulleys 72 in order that the spreader belts 75 will travel at a slightly faster rate than the spreader belts 74. Power is transmitted to the upper part of the spreader mechatatably mounted at the ends of the bars 65 is a shaft 71 with an endless belt 77 connecting the pulley 76 with a pulley 78 mounted on the power shaft 26. Note that the endless belt 77 is twisted in order to reverse the rotational movement of the pulleys 72, 73. This brings about the proper directional movement of the endless spreader belts 61, 62, 63 and 74, 75 so that cloth 80 that is placed between the upper and lower sets of endless conveyors 61, 62, 63 and 74, 75 respectively will become engaged between the upper and lower groups of spreader belts and be carried rearwardly as well as outwardly by means of a wiping action effected by the spreader belts.

The speeds of the conveyer belts 13, 16 and the spreader belts 61, 62, 63 and 74, 75 must be such that the flat work placed on the forward end of the conveyor belts 13 and the spreader mechanism S will advance at an even speed toward the rear portion of my spreader apparatus 10 so that the leading edge as well as the trailing edge of the flat work will extend evenly across the apparatus 10. The pulley 25 on the power shaft 26 which conveys the rotational power to the roller 15 is slightly smaller than the pulleys 53 on the same power shaft 26 which convey their rotational power to the pulleys 48 and 49. Consequently, the conveyor belts 13, 16 will travel at a slightly lesser speed than the spreader belts 61, 62 but the rearward movement of the spreader belts 61, 62 in a plane parallel to the path of movement of the conveyor belts 13, 16 will be equal. Also, the pulley 59 which is slightly larger than the pulley 53 will compel the outer spreader belt 63 to travel at a slightly greater speed than the spreader belts 61, 62. The slightly greater speed which effects the wiping action of the outer spreader belts 63 keeps the side edges of the flat work 80 from lagging behind the corresponding inner portions of the flat work 80 whereby the cloth 80 will advance evenly along its entire width. To assist in this even movement of the flat work 80, the end pulleys 73 of the upper group are slightly larger than the inner pulleys 72 so that the conveyor belts 75 will move at a slightly faster speed than that of the spreader belts 74, 61, 62 and 63.

A plurality of idler supporting brackets 85 and 86 secured to the frame F support a plurality of weighted idler rollers 87 and 88. These rollers 87 and 88 positioned along the centerline of my apparatus 10 are not powered but are made to rotate by the moving flat work 80 as the latter moves rearwardly on the conveyor belts 13, 16 and the spreader belts 61, 62, 63 and 72, 73. The weights of the idlers 87 and 88 prevent either of the group spreader belts on each side of my apparatus 10 from pulling the cloth out of the other group of spreader belts in the event the flat work was not placed properly on the conveyor belts 13 by the operator.

When the leading edge of a sheet or other flat work 80 arrives at the rear ends of the conveyor belts 13, 16, it falls downwardly until it reaches the inclined discharge conveyor belts 37. The more rapidly moving discharge conveyor belts 37 will carry the forward edge of the flat work upwardly to the uppermost end of the belts 37 to be discharged by the belts 37 to conveyor belts of a conventional flat work ironer. Since the conveyor belts 37 move more rapidly than the conveyor belts 13, 16, just before the trailing edge of the flat work reaches the ends of the conveyor belts 13, 16, the flat work will be extending approximately horizontally from the ends of the conveyor belts 13, 16 to the upper ends of the conveyor belts 37.

To insure that the leading edge of the flat work leaving the ends of the conveyor belts 13, 16 does fall properly on the inclined conveyor belts 37 there is an optionally provided mechanism for creating air blasts consisting of a pump 89 which maintains a tank 90 full of air under pressure. An air line 91 directs the flow of air under pressure to lines 92 and 93. Air line 93 is connected to a transversely disposed pipe 94 having a plurality of discharge openings 98. The pipe 94 extends across the width of my apparatus 10 adjacent the ends of the conveyor belts 13, 16 with the openings 98 able to direct a blast of air downwardly against the flat work lying on the conveyor belts 13, 16. A switch 96 which lies in the path of the leading edge of the flat work in proximity of the nozzle pipe 94 is in a normally open circuit in series with a second switch 97 which is normally closed and positioned in proximity of the discharge end of the conveyor belts 37. A second pipe 95 with a plurality of discharge openings 99 lies on parallel relation with the pipe 94 and positioned below the roller 35.

When the leading edge of a flat work engages the switch 96, the circuit is closed to operate a valve (not shown) and permits air under pressure to be discharged through the openings 98 and 99 in the pipes 94 and 95. The blast of air issuing from the openings 98 impinges on the upper surface of the flat work leading edge and compels the flat work to hug the belts 13, 16 and to slide evenly beyond the end of the conveyor belts 13, 16. The blast of air issuing from the openings 99 of the pipe 95 impinges on the lower surface of the flat work leading edge blowing it upwardly of the inclined conveyor belts 37 until the leading edge impinges on the switch 97 to close the valve and cut off all discharge of air under pressure. By this time the flat work is being carried evenly past the conveyor belts 13, 16 and the inclined conveyor belts 37.

From the foregoing it is apparent that there is provided herein a flat work spreading apparatus that receives dampened and washed flat work such as sheets, tablecloths, spreads, etc., at one end and delivers them to a conventional ironer in a spread and wrinkle-free condition at the other end. An operator stands in front of the apparatus 10 directly before the front ends of the conveyor belts 13 with the spreader mechanisms S at his elbows. A container of flat work will be placed in front of the operator partially beneath the conveyor belts 13. As soon as the motor 27 is energized and the conveyor belts 13, 16, 37 as well as the spreader springs or belts 61, 62, 63, 74 and 75 are in motion, the operator picks up a piece of flat work along one edge, his hands being spread apart, and places that leading edge of the flat work on the lower half of the spreading mechanisms S which extends forwardly a slight distance beyond the upper half thereof. He guides the cloth as the moving spreader springs or belts 61 and 62 commence to carry the cloth rearwardly until the upper rotating spreader belts 74 and 75 engage the cloth. The flat work 80 is now firmly gripped and begins to move rearwardly and outwardly as the cloth slides under the idler rollers 87 and 88. As explained hereinabove by virtue of the wiping action effect of the rotating spreader belts or springs 61, 62, 63, 72 and 73 the cloth is carried rearwardly and outwardly on each side of my apparatus 10. The idler rollers 87 and 88 prevent any pulling of the cloth by one spreader mechanism from the other so that the flat work 80 always remains centered on my apparatus 10. When the leading edge of the flat work rides over the switch 96 if it is desired to use the air blast, a blast of air will be discharged through the openings 98 and 99 in the pipes 94 and 95. The blast of air emanating from the pipe 94 strikes the upper surface of the cloth to flatten it downwardly on the conveyer belts 13, 16. When the flat work reaches the blast of air emanating from the pipe 95, the leading edge is lifted and permitted to fall in a flat position on the slightly faster moving conveyor belts 37. As the flat work slides upwardly with the conveyor belts 37, the leading edge strikes the switch 97 which cuts off the air blasts to the pipes 94 and 95 until the leading edge of the next flat work reaches the position of the switch 96. As the flat work 80 moves beyond the conveyor belts 16 the flat work is deposited on the conveyor belts of a conventional flat ironer (not shown) with the cloth 80 in a stretched and wrinkle-free condition to be properly ironed by the conventional flat work ironer.

Having disclosed my invention what I claim as new and desire to secure by Letters Patent of the United States is:

1. A spreading apparatus for flat work ironers comprising support members, flat work conveyor means mounted on said support members, flat work spreader means mounted substantially symmetrically on each side of said conveyor means, said spreader means extending at an oblique angle with rear end portions of said spreader means extending in a direction away from each other, said spreader means having a plurality of pulleys rotatably mounted at each end of said apparatus forming two tiers, one above the other in substantially close proximity to each other, endless belt means engaging said pulleys with portions of the upper endless belt means lying in a plane slightly below portions of said lower endless belt means whereby flat work engaged between said upper and lower endless belt means will be carried forwardly and outwardly thereby and power operated means connected to said conveyor means and said spreader means for operating said spreader means at a substantially slightly greater speed than said conveyor means whereby flat work placed on said apparatus will be advanced evenly as said spreader means spreads said flat work and removes the wrinkles therefrom.

2. The structure as recited by claim 1 wherein said pulleys rotate at substantially slightly varying speeds thereby effecting a wiping action on said flat work to remove the wrinkles.

3. The structure as recited by claim 1 taken in combination with a plurality of substantially weighted idler rollers mounted above said conveyor means adapted to rotate with the movement of said flat work along said conveyor means.

4. The structure as recited by claim 3 taken in combination with a plurality of further conveyor means mounted at the rear portion of said first named conveyor means, said further conveyor means being inclined and having one end positioned substantially below said rear portion of said first named conveyor means whereby flat work leaving said first named conveyor means will be deposited on said further conveyor means and power operated means connected to said further conveyor means operating said further conveyor means at a slightly greater speed than said first named conveyor means.

5. The structure as recited by claim 4 taken in combination with a first pipe having a plurality of discharge openings mounted above the rear portion of said first named conveyor means, a second pipe having a plurality of discharge openings mounted between both of said conveyor means, air under pressure connected to said first and second pipes and switch means mounted at the rear portion of both of said conveyor means and operated by movement of said flat work for directing air under pressure at said flat work.

6. The structure as recited by claim 1 wherein the forward end portion of said upper tier of pulleys is yieldingly supported on said support members whereby said upper tier of pulleys is adapted to swing upwardly to prevent injury to an operator.

References Cited

UNITED STATES PATENTS

| | | | |
|---|---|---|---|
| 1,912,466 | 6/1933 | Remington | 38—143 X |
| 3,153,291 | 10/1964 | Buss | 38—143 |
| 3,198,516 | 8/1965 | Withorn et al. | 271—45 |
| 3,228,127 | 1/1966 | Roiland | 38—143 |
| 1,925,582 | 9/1933 | Couch | 26—54 X |

PATRICK D. LAWSON, *Primary Examiner.*

G. V. LARKIN, *Assistant Examiner.*